US011540202B2

(12) United States Patent
Stammers et al.

(10) Patent No.: US 11,540,202 B2
(45) Date of Patent: Dec. 27, 2022

(54) SECURE CLOUD EDGE INTERCONNECT POINT SELECTION

(71) Applicant: Cisco Technology, Inc., San Jose, CA (US)

(72) Inventors: Timothy Peter Stammers, Raleigh, NC (US); Flemming Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 137 days.

(21) Appl. No.: 17/091,102

(22) Filed: Nov. 6, 2020

(65) Prior Publication Data
US 2022/0150798 A1    May 12, 2022

(51) Int. Cl.
| | | |
|---|---|---|
| H04W 4/00 | (2018.01) | |
| H04W 48/04 | (2009.01) | |
| H04W 48/18 | (2009.01) | |
| H04W 36/14 | (2009.01) | |
| H04W 76/11 | (2018.01) | |
| H04W 64/00 | (2009.01) | |

(Continued)

(52) U.S. Cl.
CPC ........... *H04W 48/04* (2013.01); *H04W 4/021* (2013.01); *H04W 36/14* (2013.01); *H04W 48/14* (2013.01); *H04W 48/18* (2013.01); *H04W 64/003* (2013.01); *H04W 76/11* (2018.02)

(58) Field of Classification Search
CPC ..... H04W 48/04; H04W 76/11; H04W 4/021; H04W 36/14; H04W 48/14; H04W 48/18; H04W 64/003
See application file for complete search history.

(56) References Cited

U.S. PATENT DOCUMENTS

| | | |
|---|---|---|
| 2012/0072979 A1 | 3/2012 | Cha et al. |
| 2016/0183085 A1* | 6/2016 | Yerrabommanahalli ................... H04L 63/107 713/153 |
| 2017/0195296 A1 | 7/2017 | Segev et al. |

(Continued)

FOREIGN PATENT DOCUMENTS

WO    2020046348 A1    3/2020

OTHER PUBLICATIONS

Jim Sun et al., "Service-Oriented Mobile Network Tracking and Guiding", Technical Disclosure Commons, Jun. 25, 2019, 10 pages.

(Continued)

*Primary Examiner* — Justin Y Lee
(74) *Attorney, Agent, or Firm* — Edell, Shapiro & Finnan, LLC

(57) ABSTRACT

Techniques are provided to use a trusted identity and location to select the most appropriate point of interconnect to edge application execution environments as well as a specific edge application execution environment. The techniques may involve obtaining, on behalf of a wireless mobile device, an access identifier that indicates an access location of the wireless mobile device that is wirelessly connected to wireless network infrastructure equipment operated by an access network provider that is associated with, and a member of, a federation of access network providers. The access location for the wireless mobile device is derived based on the access identifier, and the access location is used to select an edge resource to be used by the wireless mobile device.

20 Claims, 6 Drawing Sheets

(51) Int. Cl.
  *H04W 48/14*    (2009.01)
  *H04W 4/021*    (2018.01)

(56) References Cited

U.S. PATENT DOCUMENTS

2020/0163013 A1    5/2020   Grayson et al.
2022/0070716 A1*   3/2022   Yan ................... H04W 28/0226

OTHER PUBLICATIONS

Rebecca Silberstein, "WiFi network selection based on RSSI velocity", Technical Disclosure Commons, Dec. 19, 2018, 6 pages.
Oliver Voggenreiter et al., "Determining User Location Using IP Address and Historical Device Locations", Technical Disclosure Commons, Jun. 7, 2017, 9 pages.

* cited by examiner ical field

The present disclosure relates to mobile network communications.

BACKGROUND

Distribution of application execution environments to the network edge poses the challenge of how best to establish connectivity to those environments. For fixed devices, this is a relatively straightforward deployment problem. The device is effectively tethered to a specific port on an access switch or equivalent network element. The identifier of that device is trusted through IEEE 802.1x procedures, or other similar procedures. The combination of trusted identifier (ID) plus port can be used to identify the appropriate application execution environment.

For mobile devices with a choice of one or more access technologies at any given point, this is more complex. The level of trust placed in the end device ID plus the availability (or not) of a trusted location indicator varies by use case. A service provider offering services across both trusted and untrusted access needs to determine the optimal provider edge resources for both connectivity and application execution.

DESCRIPTION OF EXAMPLE EMBODIMENTS

Overview

Figure 1:
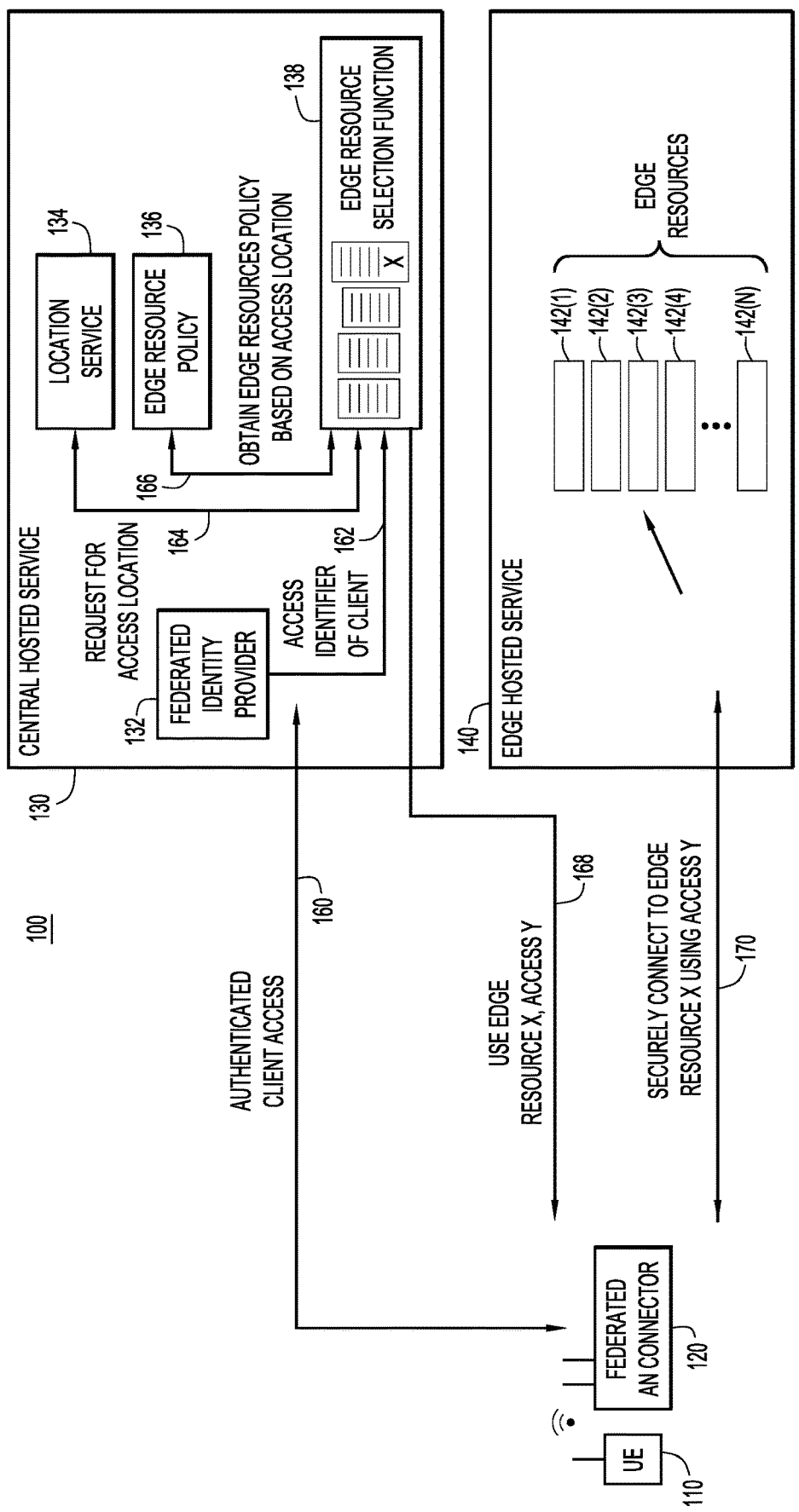
FIG. 1 is a block diagram of a network environment in which techniques for edge resource selection may be employed, according to an example embodiment.

In accordance with an example embodiment, techniques are provided to use a trusted identity and location to select the most appropriate point of interconnect to edge application execution environments as well as a specific edge application execution environment. The techniques may involve obtaining, on behalf of a wireless mobile device, an access identifier that indicates an access location of the wireless mobile device that is wirelessly connected to wireless network infrastructure equipment operated by an access network provider that is associated with, and a member of, a federation of access network providers. The access location for the wireless mobile device is derived based on the access identifier. One or more resource policies are obtained for determining an edge resource to be used for traffic associated with the wireless mobile device. An edge resource is selected for the wireless mobile device based on the one or more resource policies and the access location.

Example Embodiments

Determining edge resources in a trustworthy manner is dependent on the access type(s) used and the security of the end device identity.

Consider a public Service Provider (SP) that provides mobile cellular access. In this case, the mobile device has an associated subscriber identity provided, for example, by a subscriber identity module (SIM). The resolution to an appropriate point of edge inter-connect can be derived based on cell-ID or other cellular specific location IDs along with other factors such as load, application availability etc., because the Service Provider operates the access network.

In $4^{th}$ Generation (4G) 3 GPP network terms, this determines the Serving Gateway (SGW) and from there, the appropriate application environment. Similarly, the Session Management Function (SMF) and appropriate User Plane Function (UPF) are determined for a $5^{th}$ Generation (5G) network.

For access mechanisms not managed by the Service Provider, such as Private Cellular, Wi-Fi® wireless local area network (WLAN) access or other non-cellular access types such as LoraWAN®, this is more complex. The device will attach to one of these networks based on one or more client selection policies.

In these cases, the location information is typically not readily available to the provider of edge resource services. And even if the location information is available, it is sourced by the client and may not be reliable. An appropriate interconnect gateway, Non-3GPP Interworking Function (N3IWF) in 5G terminology, has to be selected in order to reach the appropriate provider edge resources.

Typically, a user equipment (UE)/mobile device is configured with the Fully Qualified Domain Name (FQDN) of the N3IWF that is then resolved to the address of the appropriate interconnect gateway. For cases where roaming agreements are in place, there is predetermined agreement on the result of that resolution. However there is no consideration of the location of the edge application resources or the optimal secure interconnect infrastructure when making this resolution. Additionally, where there are no pre-existing cellular roaming agreements in place, the best that can be achieved is the default interconnection point, assuming that is permitted without agreements.

Accordingly, a technique is provided to determine the optimal interconnection point for secure edge services for cases where no cellular roaming agreements are in place. A system and method are presented herein to take advantage of trust associated with a federation of wireless network providers, such as is achieved using the OpenRoaming™ technology of the Wireless Broadband Alliance, or some other trusted federation of wireless networks This trust, based on such a federation, allows a Service Provider to authenticate and authorize device access to a visited network that is not operated by the Service Provider. As part of that process, the location of the access network can be determined. This is used as the trusted location of the device in order to determine the point of interconnect to the provider network.

Reference is now made to FIG. 1 for a high-level description of the solution, according to an example embodiment. FIG. 1 shows a block diagram of a system 100 that includes a UE 110, a federated access network (AN) connector 120, a central hosted service 130 and an edge hosted service 140.

The central hosted service 130 includes a federated identity provider 132, a location service 134, an edge resource policy 136, and an edge resource selection function 138. The UE 110 does not have a service subscription with the access network provider that operates the federated AN connector 120. The federated AN connector 120 may be a wireless network infrastructure equipment operated by an access network provider that is associated with, and a member, of a federation of access network providers, such as OpenRoaming. In one example, access network in which the federated AN connector 120 is a part or member is a Wi-Fi wireless local area network (WLAN) and the federated AN connector 120 is a WLAN Access Point (AP). In another example, the access network in which the federated AN 120 is a part of member is a Low Power Wide Area Network (LPWAN), such as LoraWAN or Wireless Smart Ubiquitous Network (Wi-SUN) or any other access network using a suitable access network technology.

Since OpenRoaming trust is built on the issuance of certificates by the OpenRoaming Federation to both the access network and the identity provider, this guarantees that the access network offering OpenRoaming services is indeed trusted. This certificate is provided by the federated AN connector 120 when establishing connectivity with the federated identity provider 132. Hence, the federated AN connector 120 is trusted and so can be used as a trustworthy reference for access location.

The edge hosted service 140 includes a plurality of edge resources 142(1)-142(N). The various edge resources 142(1)-142(N) may be a computing, storage and/or networking resource that performs a service on traffic to be directed to and/or from a UE. Some applications that a UE is engaged in may be latency sensitive. For such applications, it is desirable to send the traffic in such as way so as to minimize the distance that the traffic has to travel in order to store data. Moreover, there may be regulatory requirements that govern where certain data is allowed to be stored, such as whether the data is permitted to leave a certain regional area, or not.

The edge resource selection function 138 takes the access location, together with one or more of services needed, level of reliability, and cost, and determine which of the available set of edge resources can be used. An edge resource is effectively an entry point to the hosted services network comprising the compute/memory/etc., with executing services, such as secure termination of data path or access to the required services. One example of such an entry point is a Secure Agile Exchange (SAE) service, offered by Cisco Systems, Inc.

The uniqueness of the edge resource selection function 138 stems from access to Wi-Fi location information via OpenRoaming, and (if available) combining information about cellular network access and Wi-Fi network access, and possibly selecting a different edge resource than each would have resulted in, if selected in isolation.

Technical Specification (TS) 23.748, section 5.1.1, Note 2, of the 3GPP specifications, excludes application level discovery of edge services. The study also focuses on how 5GS steers traffic to an Edge Application Server. The solution presented herein is centered on innovative ways to discover Edge Application Services and Servers, independent of a 3GPP compliant network (and in particular leveraging Wi-Fi and OpenRoaming or some other similar federated consortium technology).

Still referring to FIG. 1, a method for leveraging trusted location information of a UE for edge resource selection is now described at a high-level, according to one example embodiment. The UE 110 associates for wireless connectivity with the federated AN connector 120. Again, the federated AN connector 120 is operated by an AN provider that has no pre-existing relationship or subscription with the UE 110. At 160, the UE achieves authenticated client access via the federated identity provider 132. At 162, the federated identity provider 132 provides to the edge resource selection function 138 an access identifier of the UE 110 that is used for the UE in the federated network. This access identifier is used to obtain an access location of the UE 110 in the access network from the location service 134.

The access identifier can range from a string that the AN provider defines and serves as a key to the access location of the UE in the AN. The access identifier may embed the location (e.g., latitude/longitude coordinates or some other metro defining acronym, analogous to an area code) of the UE in some way. If the location is not embedded in the access identifier, the access identifier could be an Internet Protocol (IP) or other network address of the federated AN connector 120, and a certain IP address is learned to correspond to a particular wireless network infrastructure equipment (e.g., AP) at a certain location. In still another form, the access identifier may be a string corresponding to a particular AN AP, and that is used as a key into a location-centric database that the AN provider has provided information for, so that when the trusted access identifier is provided, the location service 134 can use it to look-up in the location-centric database to retrieve the location of the AN device corresponding to that string. Thus, the access identifier may take various of forms, ranging from embedding the location information in the access identifier itself to using the access identifier as a key into a database that has been populated by the AN provider.

At 164, the edge resource selection function 138 provides a request for an access location of the UE from the location service 134. The location service 134 returns an access location of the UE 110 to the edge resource selection function 138. Next, at 166, the edge resource selection function 138 obtains an edge resource policy 136 to select a particular edge resource based on the access location returned by the location service 134. The edge resource selection function 138 then selects a particular edge resource, e.g., edge resource X. Moreover, the edge resource X may be accessible by a particular access network type (or simply "access type"), denoted Access Y. In this example, the edge resource X corresponds to edge resource 142(3), which is accessible via Access Y corresponding to the same AN of which the federated AN connector 120 is a part.

At 168, the edge resource selection function 138 notifies the UE to use edge resource X, via access network type Y. At 170, the UE 110 securely connects to edge resource X (e.g., edge resource 142(3)) via access network type Y, that is, via the access network of which the federated AN connector 120 is a part.

Policies may be configured in various ways. In one example, the entity that provides the edge resource capability provides the policies. For example, a policy may be configured by a control center to indicate that traffic for a UE should be directed to a certain cellular Packet Data Network Gateway (PGW) for 4G. As another example, a policy could dictate that the UE connect to another Service Provider cellular network. Still another example may include to use Wi-Fi for accessing a particular edge resource or not to use Wi-Fi. Whichever entity is providing the edge connectivity that would configure the policy for mobile devices/subscribers to use when seeking that resource.

The solution presented herein is about the network determining the best edge resources to use and notifying the client how to connect to access that/those resource(s). The interaction with the edge resources may use known methods to connect to cellular infrastructure or to a Wi-Fi AN, for example.

The UE is told by the network which edge resources to use based on edge service provider policy. The discovery is achieved by the automated location determination built on the OpenRoaming identity authentication infrastructure.

Figure 2:
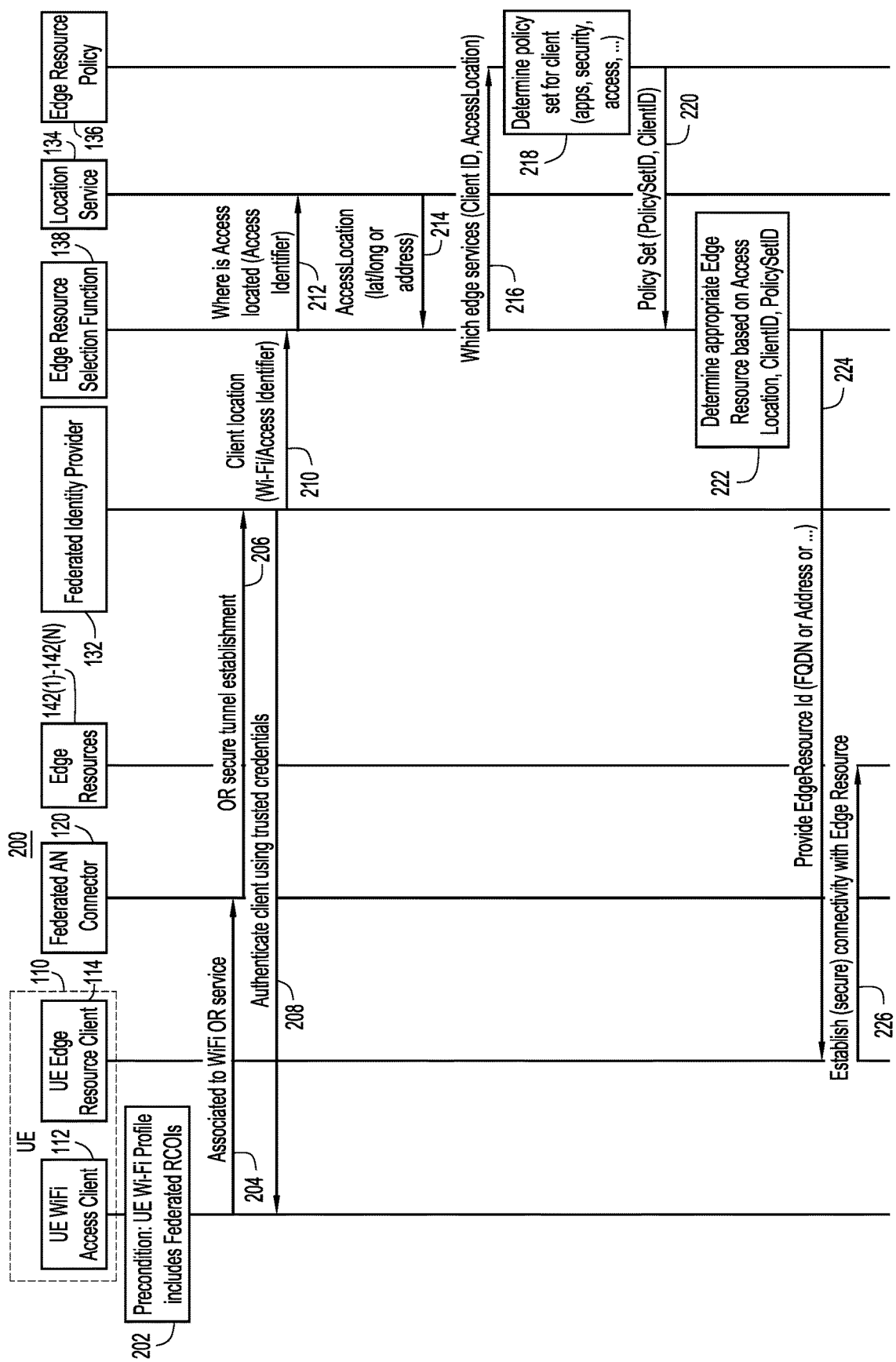
FIG. 2 is a detailed sequence diagram for implementing edge resource selection by leveraging a trusted access location derived from a mobile device, according to an example embodiment.

Reference is now made to FIG. 2 for a description of a more detailed process 200 to implement the techniques depicted in FIG. 1, according to an example embodiment. In describing the process 200, the AN network technology type of the federated AN connector 120 is Wi-Fi, as a non-limiting example. Moreover, functions of the UE 110 are broken out in more detail in FIG. 2, in which the UE 110 is shown to include a UE Wi-Fi Access Client 112 and a UE Edge Resource Client 114. The UE Wi-Fi Access Client 112 is a software function of the UE that handles the Wi-Fi access operations of the UE 110. The UE Edge Resource Client 114 is a software function that handles accessing an edge resource on behalf of the UE 110.

As shown at 202, as a precondition to the process 200, the UE Wi-Fi profile includes federated Roaming Consortium Organization Identifier (RCOI), such as used by the OpenRoaming consortium, or other similar information for some other federated organization. This enables the UE 110 to gain access to access networks operated by any service provider that operates Wi-Fi access networks compliant with OpenRoaming or other consortium.

Operations 204-208 are performed automatically when the UE 110 associates to the federated AN connector 120 when the UE 110 and the federated AN connector 120 (e.g., a Wi-Fi AP) are enabled to operate in accordance with OpenRoaming, for example.

At 204, the UE Wi-Fi Access Client 112 initiates an association to the federated (e.g., OpenRoaming) service via the federated AN connector 120. At 206, the federated AN connector 120 establishes a secure tunnel with the federated identity provider 132 using, for example, OpenRoaming procedures. At 208, the federated identity provider 132 authenticates the UE Wi-Fi Access Client 112 by way of communications via the federated AN connector 120.

As explained above, there is implicit trust between the Wi-Fi access network provider that operates the federated AN connector 120 and edge services provider inasmuch as the latter trusts the location information provided by the former. It is assumed that there is authentication with the Wi-Fi access network provider that operates the federated AN connector 120 and OpenRoaming or some other similar technology now known or hereinafter developed is used for that. The Wi-Fi access network provider may be operating an OpenRoaming-enabled access network and edge services provider is the federated identity provider 132 or has an agreement with an OpenRoaming identity provider. The OpenRoaming federation issues certificates to the federated AN connector (and other elements in that AN) and to the federated identity provider 132. The establishment of a secure path between the two to support authentication is the trust between the two entities.

A control center may be considered as an identity provider that publishes the access location to a third party edge services provider. In another example, the control center also is running a cellular network and the edge services, in which case the control center publishes to itself the access location.

Because the access network provider that operates the federated AN connector 120 is participating in OpenRoaming, an identity of the UE 110 that is validated by the federated identity provider 132 can be trusted (even though the UE 110 has no subscription service with the access network provider that operates federated AN connector 120), for purposes of determining an access location of the UE 110.

At 210, the federated identity provider 132 provides an access identifier to the edge resource selection function 138. The trigger to send a message to the edge resource selection function 138 could be 'controlled' by logic, such as "If location change notify Edge Resource Selection" or could be "Update every 1 hour" depending on the granularity of edge resource selection decision required.

Examples of the access identifier have been described above in connection with FIG. 1. The access identifier may serve as a proxy for the location of the UE, and in the example of FIG. 2, may be related to the Wi-Fi infrastructure equipment to which the UE 110 attaches, i.e., the federated AN connector 120.

At 212, the edge resource selection function 138 sends to the location service 134 a request for the access location on the access network of the UE 110 based on the access identifier. Again, in step 212, the access location of the UE 110 is obtained through the OpenRoaming procedures, and that could be provided in a couple of different ways. For example, because, as part of the establishment of trust between the access network provider that operates the access network in which the federated AN connector 120 operates, and the federated identity provider 132, that access location information may have already been provisioned. However, in a variation, that access location information may be obtained in real-time via interactions with the location service 134, as shown in FIG. 2.

At 214, the location service 134 returns to the edge resource selection function 138 the access location, which again, may take the form of a latitude/longitude or an address.

At 216, the edge resource selection function 138 sends a request to a storage of edge resource policy 136. The request includes a client identifier associated with the UE Wi-Fi Access Client 112 of the UE 110 as well as the access location of the UE 110 obtained at 214. At 218, the edge resource policy 136 determines a policy set of one or more resource policies that are applicable for the UE Wi-Fi Access Client 112 of the UE 110. The policy set may be based on one or more of the applicable application, security parameters, access network type employed by the UE 110, etc.

At 220, the edge resource policy 136 returns the policy set to the edge resource selection function 138. The edge resource selection function 138 may include a policy set identifier and the client identifier. At 222, the edge resource selection function 138 determines the appropriate edge resource based on the access location of the UE 110, the client identifier and the policy set returned by the edge resource policy 136.

At 224, the edge resource selection function 138 provides to the UE Edge Resource Client 114, via the federated AN connector 120, an edge resource identifier of the selected edge resource. The edge resource identifier may be a FQDN, an address or some other identifier of the selected edge resource.

The UE Edge Resource Client 114 establishes secure connectivity with the edge resource, at 226. At this point, the UE 110 can direct traffic to the edge resource, as needed for a particular application running on the UE 110.

Noteworthy about the process 200 is that access location information for UE is obtained even though the UE is connected on Wi-Fi, which is typically an untrusted access that would not normally provide this information in a trustworthy manner. That access location is obtained in a trusted manner and can be used to guide the selection of the edge resource. The access location information could be pre-provisioned at the federated identity provider 132, or it could be provided by the federated AN connector 120.

If the location information comes from just any entity, such as an untrusted entity, then the UE could be directed to a malicious edge resource or network resource that some nefarious entity to which it would have the UE connect. This is highly undesirable.

The process depicted in FIGS. 1 and 2 thus involves edge resource selection based on an exchange that already happened between the UE and the access network infrastructure, within which there has already been established a trust mechanism (e.g., OpenRoaming) to authenticate the UE and know that anything that comes out of the infrastructure can be trusted as being accurate or respected.

LoraWAN is another way to get a trusted location of a UE. LoraWAN has a larger range but still could be useful. In LoraWAN, a network server authenticates a device via gateways. The LoraWAN gateways are trusted, so that trust can be leveraged, particularly in use cases where the UE is traveling across a geographical region.

Some UEs can connect to more than one type of AN, and then switch connectivity between ANs. For example, consider a connected vehicle. Sometimes the vehicle has access to Wi-Fi because it may be cheaper and faster, and preferable when it is available. Other times the connected vehicle may have access only to a cellular network. In that particular case, the edge resource that is selected for the connected car should be one that works well for both the cellular network and the Wi-Fi network, or whatever other AN is used.

Figure 3:
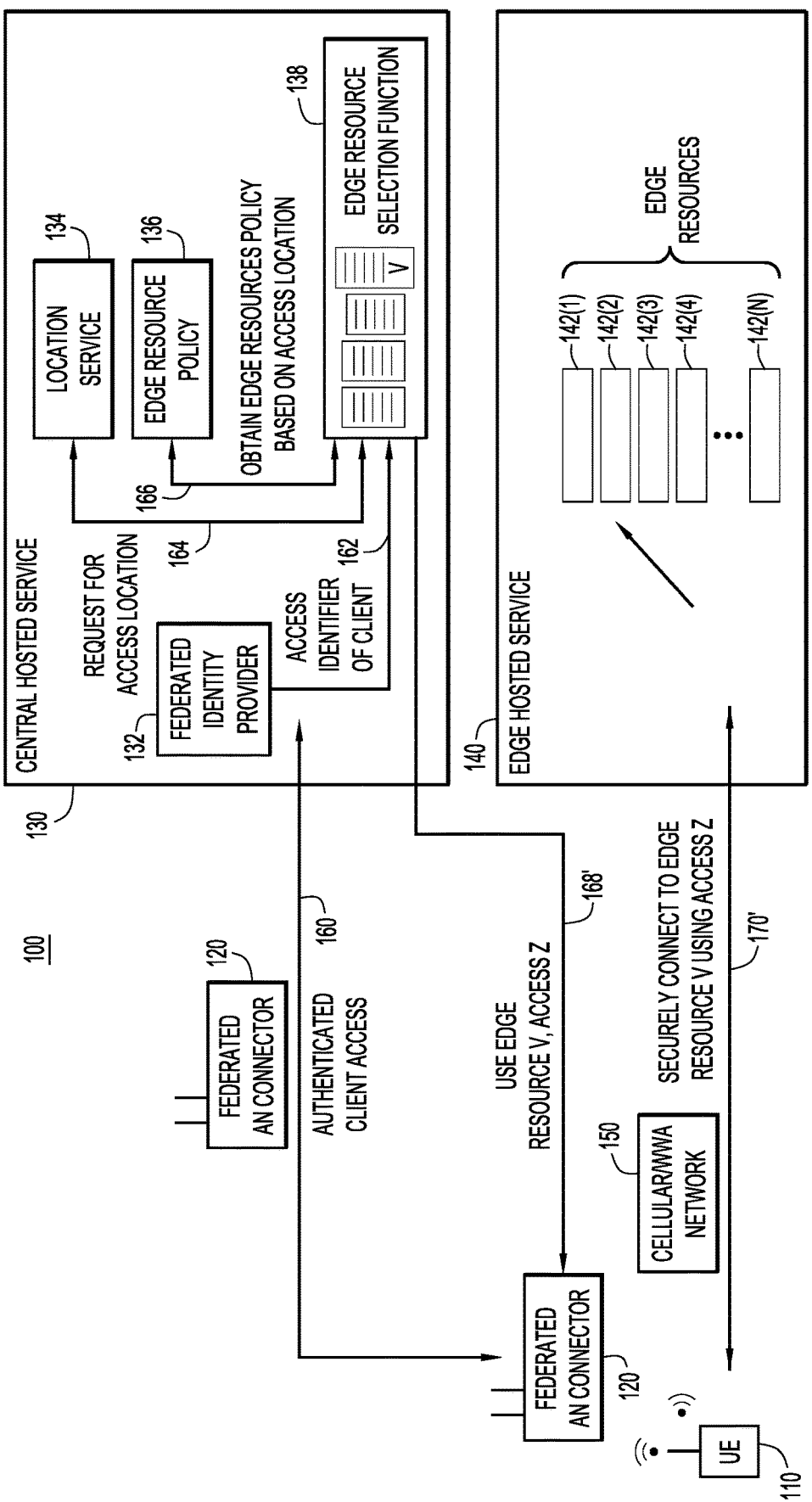
FIG. 3 is a diagram similar to FIG. 1, and depicting techniques by which an access location of a mobile device is learned through a first access network and the mobile device is instructed to access an edge resource via a second access network, according to an example embodiment.

Reference is now made to FIG. 3, which shows an example of where the UE has connectivity on a first access network of a first access network technology type, e.g., Wi-Fi, as well as having connectivity on a second access network of a second access network technology type, e.g., a cellular/wireless wide area (WWA) network, e.g., 4G, 5G, etc., shown at 150 in FIG. 3. The UE 110 has connectivity to the first access network of the first access network technology type via the federated AN connector 120, and in so doing, operations 160-166 are performed based on the access location of the UE 110 determined via its connection to the federated AN connector 120, as described above in connection with FIG. 1.

However, in the example of FIG. 3, the edge resource policy 136 takes into account the fact that the UE 110 has cellular connectivity capability, and for that and perhaps other reasons, the edge resource selection function 138 selects an edge resource "V" which corresponds to edge resource 142(2) on access type "Z", which corresponds to cellular/WWA. This is communicated to the UE 110 at 168', via the federated AN connector 120. The UE 110 then, at 170', securely connects to edge resource V (edge resource 142(2)) via access type Z (cellular/WWA network 150).

Again, FIG. 3 shows an example of a scenario in which the trusted access identifier is obtained over a first access network of a first access network technology type (e.g., a Wi-Fi network), but the UE is directed to connect to the edge resource over a second access network of a second access network technology type, e.g., cellular/WWA network.

The Wi-Fi access network path is used for the authentication step. When the edge resource has been selected, as part of informing the mobile device of which resource to use, access connectivity policy could also be provided. The solution may use existing techniques to achieve this aspect, such as mobile Software Defined WAN.

In some instances, the identity provider is the same for multiple access network types, e.g., Wi-Fi and the cellular. In this case, the identity provider can take into consideration that the user device will be on both the cellular network and the Wi-Fi network, and then select a suitable edge resource at a location that works for both of the access network types.

Figure 4:
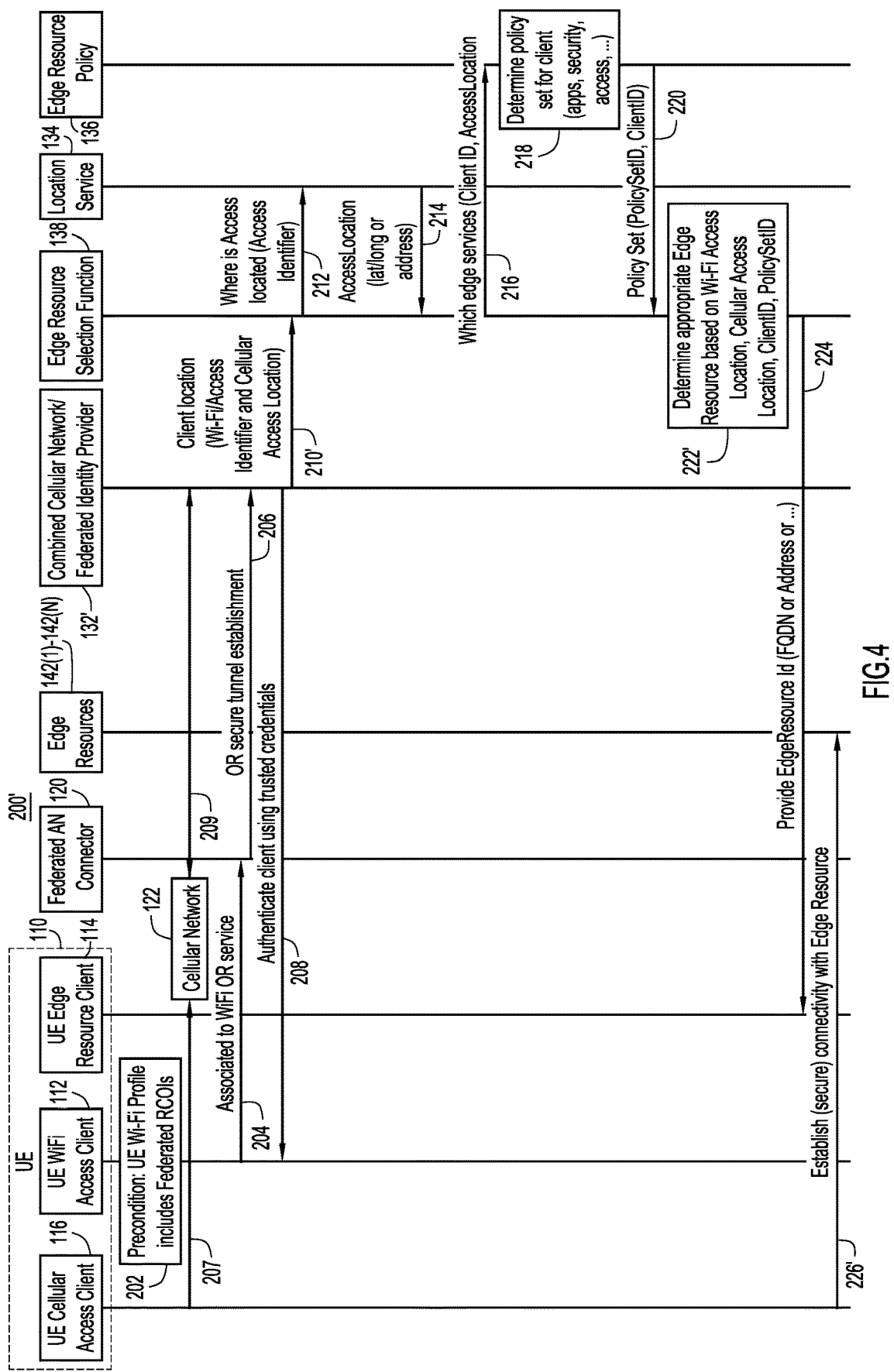
FIG. 4 illustrates a sequence diagram, similar to FIG. 2, but in which the access locations of two access network types are used to select an edge resource for a mobile device, according to an example embodiment.

To this end, reference is now made to FIG. 4. FIG. 4 illustrates a process 200' that is similar to process 200 depicted in FIG. 2, except that the edge resource selection is made based on a combination of an access location in a first access network of a first access network technology type (e.g., a Wi-Fi network) and another access location in a second access network of a second access network technology type (e.g., a cellular/WWA network). The UE 110 further includes a UE Cellular Access Client 116 as shown to manage access to a cellular network 122. In addition, the federated identity provider 132 is a combined cellular network/federated identity provider 132' that serves identity provider functions for both the first access network and the second access network.

Operations 204, 206 and 208 are the same as described in connection with FIG. 2. However, the process 200' also involves the UE Cellular Access Client 116 establishing a connection to the cellular network 122, as shown at 207 and the cellular network 122 engaging in cellular network authentication with the combined cellular network/federated identity provider 132', at 209.

At 210', the combined cellular network/federated identity provider 132' provides a client location in the form of an access identifier (as described in connection with FIG. 2) and a cellular access location. The cellular access location may be, for example, a cell ID associated with a cell tower that is serving the UE 110.

The edge resource selection function 138 still uses the access identifier to query, at 212, the location service 134 that returns, at 214, an access location of the UE in the context of the first access network, e.g., Wi-Fi network, as described above in connection with FIG. 2. In addition, at 216 the edge resource selection function 138 queries the edge resource policy 136, which, at 218, determines a policy set for the UE 110. This query and returned policy set may be further based on the cellular access location of the UE 110. The policy set is returned to the edge resource selection function 138, at 220.

At 222', the edge resource selection function 138 determines an appropriate edge resource based on the Wi-Fi-access location of the UE 110, cellular access location of the UE 110, client ID and policy set. The edge resource selection function 138 may determine an interconnect point (selected edge resource) that is a good compromise between where the UE is connected from a Wi-Fi access network context and where it is connected from a cellular network context. The edge resource selection function 138 communicates to the UE 110 the selected edge resource, at 224. In this example, it is assumed that the selected edge resource is to be accessed via the cellular access network. This is, however, only an example. Thus, at 226', the UE Cellular Access Client 116 establishes secure connectivity with the selected edge resource via the cellular network 122. It is also possible that the selected edge resource is to be accessed via the Wi-Fi access network, or that UE 110 may switch between the cellular network and the Wi-Fi access network.

When there is a need for the UE to access the same edge resource/service from both the Wi-Fi side and cellular side, the combination of using a Wi-Fi trusted location and cellular location can be quite useful. When a UE is connected to a cellular network, it is inside the cellular network service provider infrastructure and behind a set of security services that the UE can easily connect to from the cellular network. This is not the case if the UE connects via Wi-Fi. When connected via Wi-Fi, the UE has to find a way of connecting into those resources again. The solution depicted in FIG. 4 can provide a certain interworking function that the UE needs to access in order for it to access the segment of the network where those edge resource functions are actually located. Thus, using the combination of access network technologies is therefore quite useful, as is the ability to trust across access networks.

Depending on the AN technology type, operations 204-208 would be equivalent for another AN technology that provides a more accurate indication of the access location and then use that as input for the location function. In other words, there may be multiple inputs to the location service and may use the one that is most accurate, or multiple access locations, as depicted in FIG. 4. Thus, the inputs to the edge resource selection function 138 could include other inputs, including from another IDP or similar trusted entity of another AN.

In deployed cellular networks today (not 5G), it is costly in terms of signaling load to determine cell-by-cell access location. When roaming, cell location is dependent on the roaming agreement and less likely to be available, if at all. The selection of edge service location is at the level of multiple connection points per metro area for which cell identifier granularity would be required. For this case, the solution presented herein provides a trusted location without the dependencies described.

Learning the cell-by-cell access location from a 5G network provider requires a relatively complex integration. The OpenRoaming-based approach builds on the fact that the infrastructure to authorize devices to OpenRoaming-enabled visited Wi-Fi access networks is already in place. The means determining access location comes along with that capability. The Wi-Fi access networks being considered here need not have any relationship with the home network of the mobile device. Thus, there is a significantly greater potential of learning a sufficiently accurate location. Also, the mobile device may not have cellular connectivity.

Consider the example where a vehicle of a user is parked outside a retailer that has Wi-Fi service, which supports a federated consortium such as OpenRoaming. The user may prefer to use their 4G/5G cellular service. The UE will connect to Wi-Fi OpenRoaming AP and authenticate, from which an access location of the UE is determined. The last cellular tower where the UE established a session may have been many miles away. There may be a policy configured that indicates to use a 4G edge resource and connect to a particular edge location. Alternatively, for certain traffic, the policy may say that the Wi-Fi access network is preferable and use some other edge location to connect. Thus, the capabilities of the mobile device may be considered when determining which edge resource to select for use by the mobile device.

In summary, OpenRoaming is a federated consortium in which participating infrastructure provide a certain level of trust and the techniques presented herein leverage that to obtain trusted access location information. There is an assumption that there is a relationship by which the identity provider will have access to trusted information about the location information that is provided by that federated AN connector. When the UE connects through that federated AN connector, it goes through the normal identity authentication, e.g., using OpenRoaming or another federated consortium. The edge resources provide a policy for when they are to be used that is completely independent of the AN provider and the AN. Using that location information, the policy can be determined and as a result what edge resource instance should be selected based on that location information. The mobile device then connects to that selected edge resource. Importantly, there is no pre-existing subscription relationship between the access network provided that operates the federated AN connector equipment through which the UE obtains connectivity. In this solution, by nature of the federation, any entity that is part or a member of that federation can effectively connect to any AN entity that is part of that federation.

There is no need for pre-existing arrangements and pre-approved access to the services in another AN. For example, even though Wi-Fi AN may be used for the OR authentication interactions, the mobile device may be directed to a service that is reached via a cellular or other AN connectivity type. Selection of and access to edge resources is achieved using access location information derived from a trusted relationship. There is an implied relationship through the federation with the AN provider through the identity provider that indicates whether the access location information can be trusted. Completely independently there is a network of resources that has no relationship with that AN provider or any subscription the UE may have with that AN provider, and that independence is used to determine the best access network type and edge resource to connect the UE to the services. The UE subscriber may or may not have a subscription to a separate application associated with that edge resource but whatever subscription the UE has it has nothing to do with the AN provider.

These operations are performed using an access network technology, e.g., Wi-Fi, for which normally there is no access to trusted location information, unless there is a federated relationship in place with a particular AN provider.

Figure 5:
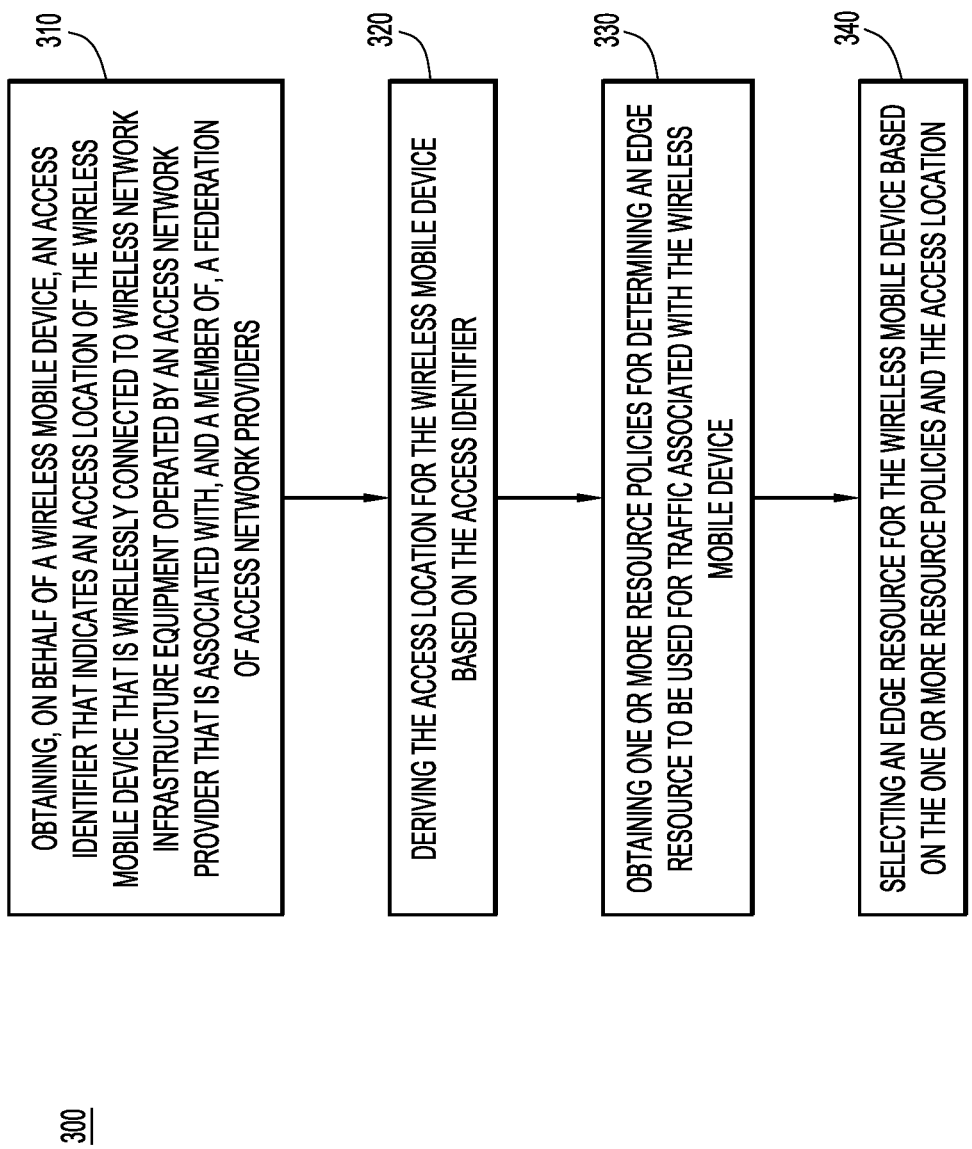
FIG. 5 is a flow chart depicting a method for selecting an edge resource for a mobile device based on an access location of the mobile device on an access network for which the mobile device has no subscription or pre-existing agreement for service, according to an example embodiment.

Reference is now made to FIG. 5. FIG. 5 illustrates a flow chart depicting a method 300 according to an example embodiment. The method 300 is performed by one or more entities in the central hosted service 130 shown in FIGS. 1 and 3, such as the edge resource selection function 138. The method 300 includes, at 310, obtaining on behalf of a wireless mobile device, an access identifier that indicates an access location of the wireless mobile device that is wirelessly connected to wireless network infrastructure equipment operated by an access network provider that is associated with, and a member of, a federation of access network providers, such as OpenRoaming. At 320, the method includes deriving the access location for the wireless mobile device based on the access identifier. At 330, the method includes obtaining one or more resource policies for determining an edge resource to be used for traffic associated with the wireless mobile device. At 340, the method includes selecting an edge resource for the wireless mobile device based on the one or more resource policies and the access location.

As described above, in one form, the wireless network infrastructure equipment is configured to operate in accordance with procedures of the federation, and process automated roaming consortium organization identifier (RCOI) information of the federation. The obtaining operation 310 of the access identifier may include receiving a message from an identity provider entity that is configured to operate in accordance with the procedures of the federation, and which identity provider entity has authenticated the wireless mobile device based on RCOI information for the wireless mobile device.

In one form, the operation 320 of deriving the access location may include extracting access location information from the access identifier within which the access location information is embedded. In another form, the operation 320 of deriving the access location may include includes supplying the access identifier to a location service that returns the access location which corresponds to a location of the wireless network infrastructure equipment.

In one form, the access identifier is unique to the access network provider.

In one form, the federation of access network providers employs the OpenRoaming® authentication standard.

The method 300 may further include sending to the wireless mobile device, edge resource selection information identifying the edge resource and an access type for the edge resource to enable the wireless mobile device to establish connectivity with the edge resource.

As described above, the wireless network infrastructure equipment may operate in accordance with a first wireless access network technology, and the wireless mobile device establishes connectivity with the edge resource via a second wireless access network technology. In one form, the first wireless access network technology is IEEE 802.11 wireless local area network technology or LoraWAN technology and the second wireless access network technology is wide area cellular network technology.

In one form, the wireless network infrastructure equipment operates in accordance with a first wireless access network technology, and the wireless mobile device is configured to operate with the first wireless access network technology and with a second wireless access network technology. The selecting operation 340 may include selecting the edge resource for the wireless mobile device based on the one or more resource policies, the access location for the wireless mobile device with respect to the first wireless access network technology, and another access location of the wireless mobile device with respect to the second wireless access network technology.

Again, in one form, the first wireless access network technology is IEEE 802.11 wireless local area network technology or LoraWAN technology and the second wireless access network technology is wide area cellular network technology.

Moreover, in one form, the access identifier that is used to derive the access location for the wireless mobile device with respect to the first wireless access network technology, and the access location for the wireless mobile device with respect to the second wireless access network technology, are obtained from an identity provider that is configured to provide authentication services for both the first wireless access network technology and the second wireless access network technology.

The above provides the basic operation where an OpenRoaming enabled Wi-Fi access network alone is used for location determination of the edge resources. The device establishes connectivity via cellular access.

However when the client is connected to both the cellular access network and Wi-Fi access network (or switches between the two access networks), the optimal location for the application execution environment needs to consider both the cellular network and the Wi-Fi access network, as depicted in FIG. 4. One example of this involves the use of a control center as the identity service provider (e.g. using Extensible Authentication Protocol-Subscriber Identity Module (EAP-SIM)).

Secure cloud edge envisages a mobile asset that attaches to an optimal application execution environment as it moves location and across access technologies. Secure cloud edge is an approach that distributes edge connectivity and application environments across a geography, such as a country. As vehicles move and so change the type and place of access network connection, the approach described is one possible approach to address the issue of which point of connectivity to choose. The ability to roam across access technologies without a plethora of formal roaming agreements is facilitated by OpenRoaming. The solution presented herein makes use of the 'on-demand' nature of OpenRoaming or other similar authentication processes to learn the access location of the UE and so influence the selection of the secure cloud edge interconnection point. When the OpenRoaming identity provider is also the cellular service provider, the selection can take the cellular access location into account as well. This scenario may involve use of a control center, referred to above.

Figure 6:
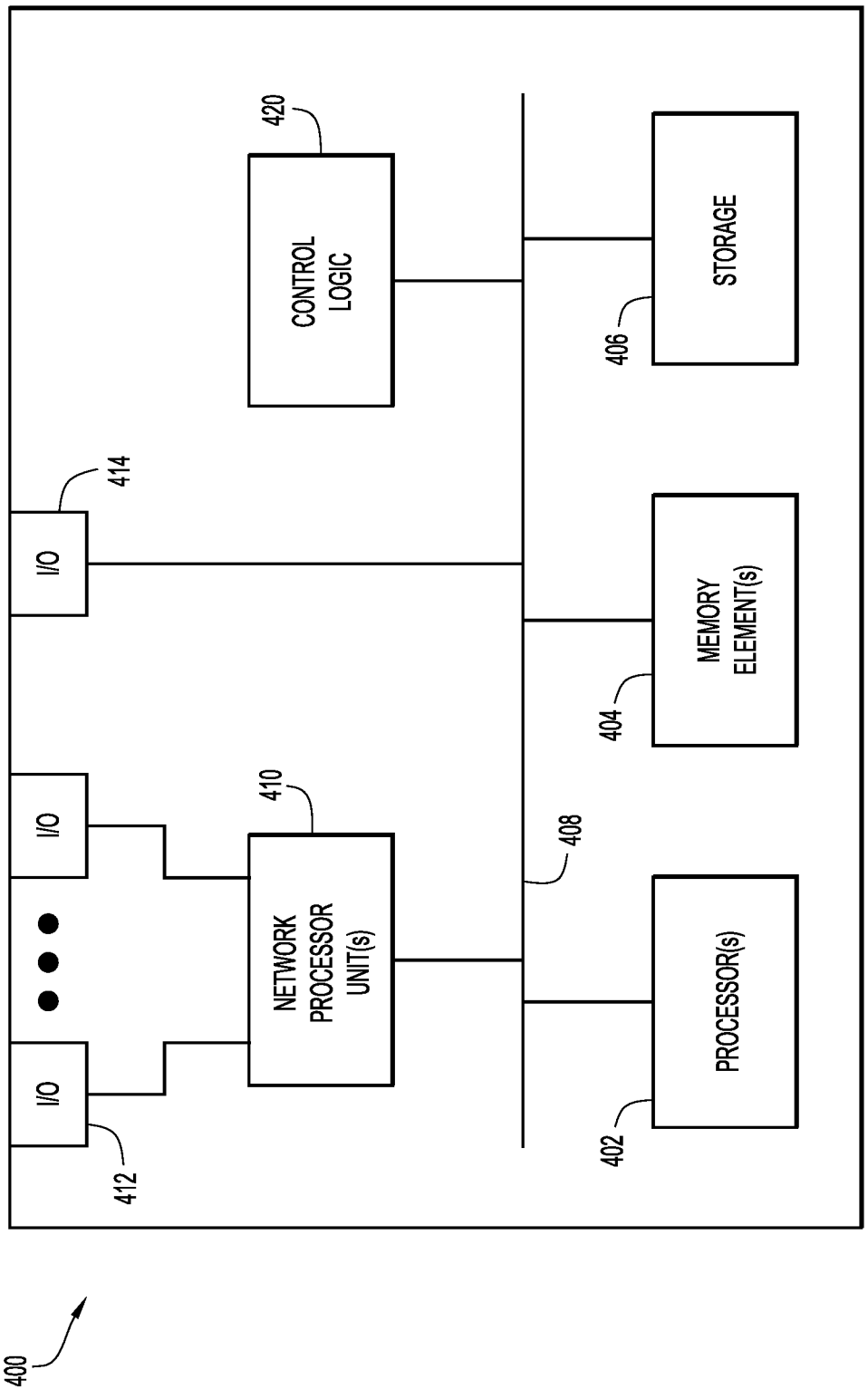
FIG. 6 is a hardware block diagram of a computing device that may be configured to perform the techniques presented herein, according to an example embodiment.

Referring to FIG. 6, a hardware block diagram is provided of a computing device 400 that may perform functions associated with operations described herein in connection with the FIGS. 1-5. In various embodiments, a computing device, such as computing device 400 or any combination of computing devices 400, may be configured as any entity/entities as discussed for the techniques depicted in connection with FIGS. 1-5 in order to perform operations of the various techniques discussed herein.

In at least one embodiment, the computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, a method is provided that includes: obtaining, on behalf of a wireless mobile device, an access identifier that indicates an access location of the wireless mobile device that is wirelessly connected to wireless network infrastructure equipment operated by an access network provider that is associated with, and a member of, a federation of access network providers; deriving the access location for the wireless mobile device based on the access identifier; obtaining one or more resource policies for determining an edge resource to be used for traffic associated with the wireless mobile device; and selecting an edge resource for the wireless mobile device based on the one or more resource policies and the access location.

In another form, an apparatus is provided comprising: a network interface configured to enable network communications; and one or more processors coupled to the network interface, and configured to perform operations including: obtaining, on behalf of a wireless mobile device, an access identifier that indicates an access location of the wireless mobile device that is wirelessly connected to wireless network infrastructure equipment operated by an access network provider that is associated with, and a member of, a federation of access network providers; deriving the access location for the wireless mobile device based on the access identifier; obtaining one or more resource policies for determining an edge resource to be used for traffic associated with the wireless mobile device; and selecting an edge resource for the wireless mobile device based on the one or more resource policies and the access location.

In still another form, one or more non-transitory computer readable storage media encoded with instructions that, when executed by at least one processor, cause the at least one processor to perform operations including: obtaining, on behalf of a wireless mobile device, an access identifier that indicates an access location of the wireless mobile device that is wirelessly connected to wireless network infrastructure equipment operated by an access network provider that is associated with, and a member of, a federation of access network providers; deriving the access location for the wireless mobile device based on the access identifier; obtaining one or more resource policies for determining an edge resource to be used for traffic associated with the wireless mobile device; and selecting an edge resource for the wireless mobile device based on the one or more resource policies and the access location.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, on behalf of a wireless mobile device, an access identifier that indicates an access location of the wireless mobile device that is wirelessly connected to wireless network infrastructure equipment operated by an access network provider that is associated with, and a member of, a federation of access network providers, wherein obtaining the access identifier includes receiving a message from an identity provider entity that is configured to operate in accordance with procedures of the federation, and which identity provider entity has authenticated the wireless mobile device based on roaming consortium organization identifier information for the wireless mobile device;
deriving the access location for the wireless mobile device based on the access identifier;
obtaining one or more resource policies for determining an edge resource to be used for traffic associated with the wireless mobile device; and
selecting an edge resource for the wireless mobile device based on the one or more resource policies and the access location.

2. The method of claim 1, wherein the wireless network infrastructure equipment is configured to operate in accordance with procedures of the federation, and to process the roaming consortium organization identifier information.

3. The method of claim 1, wherein deriving the access location includes extracting access location information from the access identifier within which the access location information is embedded.

4. The method of claim 1, wherein deriving the access location includes supplying the access identifier to a location service that returns the access location which corresponds to a location of the wireless network infrastructure equipment.

5. The method of claim 1, wherein the access identifier is unique to the access network provider.

6. The method of claim 1, wherein the federation of access network providers employs a trust-based authentication standard.

7. The method of claim 1, further comprising:
sending to the wireless mobile device, edge resource selection information identifying the edge resource and an access type for the edge resource to enable the wireless mobile device to establish connectivity with the edge resource.

8. The method of claim 1, wherein the wireless network infrastructure equipment operates in accordance with a first wireless access network technology, and wherein the wireless mobile device establishes connectivity with the edge resource via a second wireless access network technology.

9. The method of claim 8, wherein the first wireless access network technology is IEEE 802.11 wireless local area network technology or LoraWAN technology and the second wireless access network technology is wide area cellular network technology.

10. The method of claim 1, wherein the wireless network infrastructure equipment operates in accordance with a first wireless access network technology, and the wireless mobile device is configured to operate with the first wireless access network technology and with a second wireless access network technology, and wherein selecting includes selecting the edge resource for the wireless mobile device based on the one or more resource policies, the access location for the wireless mobile device with respect to the first wireless access network technology, and another access location of the wireless mobile device with respect to the second wireless access network technology.

11. The method of claim 10, wherein the first wireless access network technology is IEEE 802.11 wireless local area network technology or LoraWAN technology and the second wireless access network technology is wide area cellular network technology.

12. The method of claim 10, wherein the access identifier that is used to derive the access location for the wireless mobile device with respect to the first wireless access network technology, and the access location for the wireless mobile device with respect to the second wireless access network technology, are obtained from an identity provider that is configured to provide authentication services for both the first wireless access network technology and the second wireless access network technology.

13. An apparatus comprising:
a network interface configured to enable network communications; and
one or more processors coupled to the network interface, and configured to perform operations including:
obtaining, on behalf of a wireless mobile device, an access identifier that indicates an access location of the wireless mobile device that is wirelessly connected to wireless network infrastructure equipment operated by an access network provider that is associated with, and a member of, a federation of access network providers, wherein obtaining the access identifier includes receiving a message from an identity provider entity that is configured to operate in accordance with procedures of the federation, and which identity provider entity has authenticated the wireless mobile device based on roaming consortium organization identifier information for the wireless mobile device;

deriving the access location for the wireless mobile device based on the access identifier;

obtaining one or more resource policies for determining an edge resource to be used for traffic associated with the wireless mobile device; and selecting an edge resource for the wireless mobile device based on the one or more resource policies and the access location.

14. The apparatus of claim 13, wherein the wireless network infrastructure equipment is configured to operate in accordance with procedures of the federation, and to process the roaming consortium organization identifier information.

15. The apparatus of claim 13, wherein the one or more processors are configured to derive the access location by performing one of: extracting access location information from the access identifier within which the access location information is embedded, or supplying the access identifier to a location service that returns the access location which corresponds to a location of the wireless network infrastructure equipment.

16. The apparatus of claim 13, wherein the one or more processors are configured to send to the wireless mobile device, edge resource selection information identifying the edge resource and an access type for the edge resource to enable the wireless mobile device to establish connectivity with the edge resource.

17. One or more non-transitory computer readable storage media encoded with instructions that, when executed by at least one processor, cause the at least one processor to perform operations including:

obtaining, on behalf of a wireless mobile device, an access identifier that indicates an access location of the wireless mobile device that is wirelessly connected to wireless network infrastructure equipment operated by an access network provider that is associated with, and a member of, a federation of access network providers, wherein obtaining the access identifier includes receiving a message from an identity provider entity that is configured to operate in accordance with procedures of the federation, and which identity provider entity has authenticated the wireless mobile device based on roaming consortium organization identifier information for the wireless mobile device;

deriving the access location for the wireless mobile device based on the access identifier;

obtaining one or more resource policies for determining an edge resource to be used for traffic associated with the wireless mobile device; and selecting an edge resource for the wireless mobile device based on the one or more resource policies and the access location.

18. The one or more non-transitory computer readable storage media of claim 17, wherein the wireless network infrastructure equipment is configured to operate in accordance with procedures of the federation, and to process the roaming consortium organization identifier information.

19. The one or more non-transitory computer readable storage media of claim 17, wherein deriving the access location includes one of: extracting access location information from the access identifier within which the access location information is embedded, or supplying the access identifier to a location service that returns the access location which corresponds to a location of the wireless network infrastructure equipment.

20. The one or more non-transitory computer readable storage media of claim 17, further including instructions that, when executed by the at least one processor, cause the at least one processor to perform sending to the wireless mobile device, edge resource selection information identifying the edge resource and an access type for the edge resource to enable the wireless mobile device to establish connectivity with the edge resource.

* * * * *